United States Patent
Winebrener

[15] 3,686,549
[45] Aug. 22, 1972

[54] POWER CONTROL SYSTEM
[72] Inventor: Gary L. Winebrener, Fraser, Mich.
[73] Assignee: General Motors Corporation, Detroit, Mich.
[22] Filed: Feb. 1, 1971
[21] Appl. No.: 111,181

[52] U.S. Cl. ................... 318/139, 318/341, 290/50, 307/80
[51] Int. Cl. .......................................... H02p 1/00
[58] Field of Search ........ 318/139, 440, 341; 307/80, 307/81; 180/60; 290/38, 50

[56] References Cited

UNITED STATES PATENTS

| | | | |
|---|---|---|---|
| 3,443,115 | 5/1969 | Timmerman | 320/3 |
| 3,356,173 | 12/1967 | Holcombe | 318/139 |
| 3,336,516 | 8/1967 | Kelley | 318/139 |
| 3,179,198 | 4/1965 | Hastings | 180/65 |
| 3,349,309 | 10/1967 | Dannettell | 318/341 |
| 3,297,880 | 1/1967 | Clarke | 307/80 |
| 2,761,978 | 9/1956 | Plumi | 290/38 |
| 3,560,818 | 2/1971 | Amato | 318/138 |

OTHER PUBLICATIONS

G.E. Electric Vehicle, S.A.E. Paper No. 680,430, 1968

Primary Examiner—G. R. Simmons
Attorney—E. W. Christen and C. R. Meland

[57] ABSTRACT

A primary battery or energy battery and a secondary battery or power battery are connected through a pair of synchronized pulse modulators with a drive motor in the vehicle electric drive power supply system of this invention. The energy battery alone supplies power to the drive motor when power, voltage, current, and speed parameters of the electric drive are each within a first predetermined range of values. If one or more of the measured parameters is within a second predetermined range of values, power from the power battery complements power from the energy battery to supply the motor. According to the invention, when the two batteries are jointly supplying the motor, each battery is sequentially and periodically connected with the motor through its respective pulse modulator such that each battery has a variable duty cycle; however, conduction by the batteries is complementary in time within each cycle of the pulse modulators and simultaneous connection of both batteries with the motor is precluded.

5 Claims, 4 Drawing Figures

Patented Aug. 22, 1972

INVENTOR.
Gary L. Winebrener
BY
C. L. Meland
ATTORNEY

Patented Aug. 22, 1972

INVENTOR.
Gary L. Winebrener
BY
C. R. Meland
ATTORNEY

POWER CONTROL SYSTEM

This invention relates to a power control system for a dual battery vehicle electric drive.

Conventional vehicle electric drive power supply systems regulate the power delivered from an electric source to an electric drive motor according to system demand. Among these conventional vehicle electric drive systems are dual battery supply arrangements wherein the power required by the electric drive motor is drawn from two separate battery sources. In these dual battery arrangements one of the batteries is generally the primary source of electric energy, while the other is a secondary source providing power during limited time intervals. The power of the primary source is augmented by the power of the secondary source in these known electric drive arrangements by connecting the two batteries serially or in shunt such that simultaneous current flow from both batteries to the motor results. In the shunt connection systems, the terminal voltage of the two batteries must be equal to avoid discharge of one battery through the other.

In contrast with these known electric drive supply systems, the dual battery arrangement of the present invention provides a dual source connection wherein power from the main battery is augmented by power from a secondary battery by means of sequential and periodic, complementary connections between the batteries and the electric drive motor. In this system, the primary battery or energy battery can take any of a variety of known forms, for example, a zinc-air replaceable electrode battery can be used. The secondary battery or power battery can also take a variety of known forms, for example, a conventional lead acid storage battery has been satisfactorily used. In the arrangement of this invention, the terminal voltage levels of these two batteries can be identical or they can vary according to the optimum design of the batteries and the electric drive systems.

In the present invention, power is supplied the drive motor from the energy battery in two distinct modes. The first mode of power supply is frequency modulation wherein the energy battery is connected with the electric drive motor for a fixed interval at a variable frequency; the second mode of power supply is pulse width control wherein the width of the voltage pulses from the energy battery is varied to regulate the voltage level and the power level delivered to the motor from the energy battery. It is in this second mode of pulse width modulation that the power battery is used to augment the power from the energy battery to drive the motor when system conditions require that the power from the energy battery be augmented by power from the power battery.

In the pulse width mode during dual battery operation, a pair of pulse modulators synchronized for controlled operation alternately connect the energy battery and the power battery with the electric drive motor. In this manner, the energy battery and the power battery complement each other in operation and concurrent power is supplied from each to the motor but simultaneous connection of the two batteries with the motor is precluded by the synchronization scheme of the pulse modulators.

Accordingly, it is an object of the present invention to provide a power control system for an electric drive motor in a vehicle electric drive wherein a primary source of direct voltage and a secondary source of direct voltage are each operated with a variable duty cycle to supply power to the electric drive motor by sequential and complementary connections of each with the electric drive motor.

Another object of the present invention is to provide a dual battery power supply system for an electric drive vehicle wherein a pair of pulse modulators including controllable switching devices interconnect an energy battery and a power battery with an electric drive motor to permit concurrent supply of power and to prevent simultaneous supply of current from both batteries to the electric drive motor such that each battery has a variable duty cycle and such that each battery provides a portion of the power required by the motor.

It is another object of this invention to provide a power supply system for an electric drive motor in a vehicle electric drive having two distinct operating modes wherein in a first mode of operation the electric drive motor is supplied exclusively from the energy battery and in a second mode of operation the electric drive motor is supplied from both the energy battery and a power battery in a manner such that each battery has a variable duty cycle and such that each battery supplies a portion of the power required by the motor without simultaneously connecting the two batteries with the motor.

Additional objects and advantages of the present invention will be apparent from the following description wherein the figures listed below are incorporated as illustrating the preferred embodiment.

Figure 1:
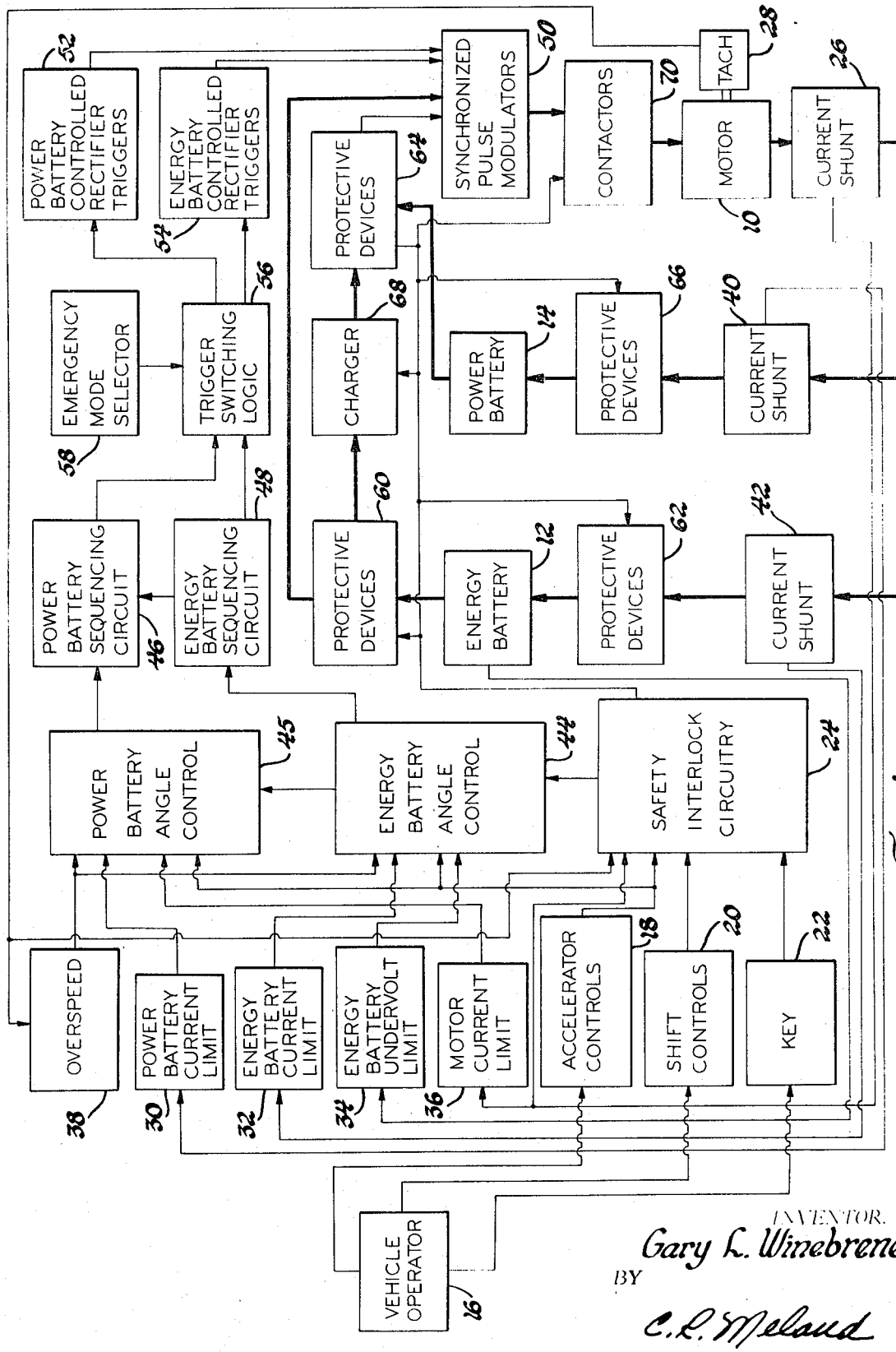
FIG. 1 is a block diagram of the controls required in a vehicle electric drive including the dual battery supply controls of the present invention.

Reference should now be made to the drawings and more particularly to FIG. 1 wherein a complete block diagram of the controls for the vehicle electric drive system is shown. Heavy arrows indicate power flow in the motor-battery circuits, and light arrows indicate control connections. A DC series motor 10 is powered by an energy battery 12 and a power battery 14 according to the control sequence set forth hereinafter. The motor is connected through a speed reduction gear box and differential (not illustrated) to drive the rear wheels (not illustrated) of the electric drive vehicle. More than one motor could be used in the drive system of this electric drive: the use of a single motor driving the rear wheels is an assumption made for the purpose of the following discussion. Other drive configurations could be readily adapted for use with the described power supply system by one skilled in the art.

To initiate and control vehicle operation, the vehicle operator 16 manually regulates accelerator controls 18, shift controls 20, and a vehicle key control 22. The vehicle key control 22 is an electrical switch similar to the ignition switch control of conventional vehicles powered by internal combustion engines. The shift controls 20 also comprise a switch function to permit selection by the operator of a forward or reverse mode of operation, and the accelerator controls 18 allow the vehicle operator to regulate the speed and power levels of the motor 10 by means of an accelerator pedal.

In operation, each of the controls 18, 20, and 22 is provided a DC input signal and each has an output signal dependent on the respective control position. The switches of the key control and shift control provide outputs dependent on the switch positions whereas the accelerator control includes a potentiometer or other variable resistance element to afford an output signal which varies with the position of the accelerator pedal. The accelerator controls 18, shift controls 20, and vehicle key control 22 output electrical signals are connected with a safety interlock 24. These control signal connections are indicated in the drawing by light arrows, as noted above.

The safety interlock circuitry 24 is provided in addition to the three inputs noted, an input indication of motor current from a motor current shunt 26 and an input indication of motor speed from a tachometer 28. The safety interlock circuitry 24 senses the instantaneous conditions of the five inputs applied to the interlock and makes a determination as to whether predetermined initial conditions are fulfilled prior to initiating forward or reverse vehicle operation or a change therebetween. This interlock function can be accomplished by known logic circuits wherein a plurality of inputs are monitored and an output is developed according to the number of inputs present and the sequence of their application to the safety interlock. The initial conditions required for vehicle operation include a "stationary" indication (e.g., vehicle velocity in range of 0–6 mph) from the tachometer 26 indicating the vehicle is not moving, a "zero" current indication (e.g., motor current less than 20 amps) from the motor current shunt 26 indicating the motor is not energized, a signal from the accelerator controls 18 indicating the accelerator is in its nondepressed position, a signal from the shift controls 20 indicating a neutral position for the shift controls, and a signal from the vehicle key control 22 indicating the operator desires to commence vehicle operation. During vehicle operation, the safety interlock circuitry 24 prevents shifting of the shift controls 20 when the vehicle is moving, but, otherwise, is not effectual as a dynamic control.

Each of the limit controls 30, 32, 34, and 36 of the drawing and the overspeed sensor 38 have outputs providing a high value or low value depending on the vehicle system operating parameter sensed by the particular control. This is accomplished in each of the limit controls by applying a reference sawtooth waveform and a DC signal correlated with the sensed parameter to a comparator (not illustrated) whose output state changes when the instantaneous voltage magnitude of the ramp voltage of the sawtooth signal exceeds the DC input. The sawtooth waveform is generated by a conventional sawtooth oscillator (not illustrated), and the comparator used is of conventional design, both being generally known in the art. Each of the control limit comparators has a high value output at the start of each sawtooth cycle, switching to a low value output in the cycle if the ramp voltage of the sawtooth exceeds the DC voltage applied to the comparator of the particular control limit.

By way of example, the current shunt 26, comprised of a low value resistor in the power circuit of the motor 10, senses the current supplied to the motor 10 to develop a DC voltage indication of the motor current for connection with the motor current limit 36. The sawtooth is applied to the other input of the comparator and the comparator switches from a high value output to a low value output if and when the ramp voltage input exceeds the DC voltage input. If the comparator changes states during the sawtooth cycle, it resets at the end of the cycle when the ramp voltage drops to zero. Similarly, tachometer 28 provides a calibrated DC voltage indication of motor speed for comparison with the sawtooth waveform to develop a control output from the overspeed sensor 38 in response to the speed of the motor 10. The tachometer 28 can take a variety of known forms including a DC generator providing a voltage output proportional to speed. Similarly, power battery current limit 30 provides an output dependent on the level of the calibrated DC voltage from current shunt 40 measuring the current of the power battery. Energy battery current limit 32 provides an output dependent on the level of the calibrated DC voltage from current shunt 42 measuring the current of the energy battery. And energy battery undervoltage limit 34 provides an output dependent on a DC voltage related to the terminal voltage of the energy battery 12. Low value output signals from the limit controls affect the vehicle system operation in a manner more fully explained below.

An energy battery angle control 44 provides control of the pulse width of energy battery voltage pulses supplied the motor 10. The energy battery angle control 44 is provided input signals from the accelerator controls 18, from the energy battery current limit 32, from the energy battery undervoltage limit 34, from the motor current limit 36, and from the overspeed sensor 38. The five recited input connections to the energy battery angle control 44 provide a composite control of the width of voltage pulses supplied by the energy battery 12. In operation, the pulse width is limited by the input control signal which dictates the minimum voltage pulse. This is more fully described hereinafter with respect to the circuit schematic of FIG. 2. Frequency modulation control of energy battery 12 is effected when the five input controls to the energy battery angle control 44 indicate a low power demand for the motor 10. This mode of operation is dictated primarily by the acceleration controls 18, and it too will be described hereinafter.

A power battery angle control 45 provides an analogous control of the connection between the power battery 14 and the motor 10. The power battery angle control 45 is provided an input from the accelerator controls 18, the power battery current limit 30, the motor current limit 36, the overspeed sensor 38, and the energy battery angle control 44. The power battery angle control 45 is disabled until provided an enabling signal from the energy battery angle control 44. When operative, the power battery angle control 45 determines the width of voltage pulses from the power battery 14 limited by the overspeed sensor 28, the power battery current limit 30, the motor current limit 36, or the accelerator controls 18 in a manner more fully discussed below.

Two sequencing circuits control the gating and synchronization of controlled rectifiers interconnecting the batteries with the motor 10. The power battery sequencing circuit 46 and the energy battery sequencing circuit 48 of the drawing, determine the order of firing for silicon controlled rectifiers included in the two pulse modulators respectively connecting the power battery 14 and the energy battery 12 with the motor 10. These pulse modulators are shown as synchronized pulse modulators 50 in the drawing. The power battery controlled rectifier triggers 52 provide the requisite control of the power battery pulse modulator included in the synchronized pulse modulators 50. The energy battery controlled rectifier triggers 54 control the controlled rectifiers of the energy battery pulse modulator. The operation of these pulse modulators is more fully developed below in conjunction with the schematic of FIG. 2.

A trigger switching logic network 56 provides an emergency mode of operation to accommodate emergency demand if the energy battery 12 is inoperative or is fully discharged. An emergency mode selector 58 is manually actuated by the vehicle operator to initiate operation in the emergency mode. Mode selector 58 can take the form of a switch controlling the connection of the sequencing circuits 46 and 48 with the triggers 52 and 54 through the logic network 56. In the emergency mode, the trigger switching logic disables the power battery controlled rectifier sequencing circuit 46 and applies the energy battery sequencing pulses from the energy battery sequencing circuit 48 to the power battery triggers. This completes the control circuitry of the schematic diagram and the power circuitry will be described next.

Reference should now be made to the power circuits of the energy battery 12 and the power battery 14 which are identified in the drawing by heavy, dark arrows. Two energy battery protective devices 60 and 62 provide isolation of both the negative and positive terminals of the energy battery 12 during nonoperating time periods. Likewise, the power battery protective devices 64 and 66 provide isolation of both the terminals of the power battery 14 during these time intervals. All four of these protective devices are connected with the safety interlock circuitry 24 to sense whether operation is required. In practice, the protective devices could take many forms; an electromechanical circuit breaker actuated by the control signal output of safety interlock circuitry 24 can be used for the required isolation. In addition, fuse members can be included in the protective devices blocks to ensure against excessive currents.

A charger 68 is included to continually charge the power battery 14 at a relatively low charging current from the energy battery 12. Of course, the charger, like the protective devices, is supplied a control signal from the safety interlock circuitry 24 so that it is inoperative except during periods of vehicle operation. Contactors 70 reverse the motor terminal connections to reverse the operation of the motor 10 when the shift controls 20 are set to select reverse operation. Current flow in the power circuits is controlled by the synchronized pulse modulators 50 described below.

Figure 2:
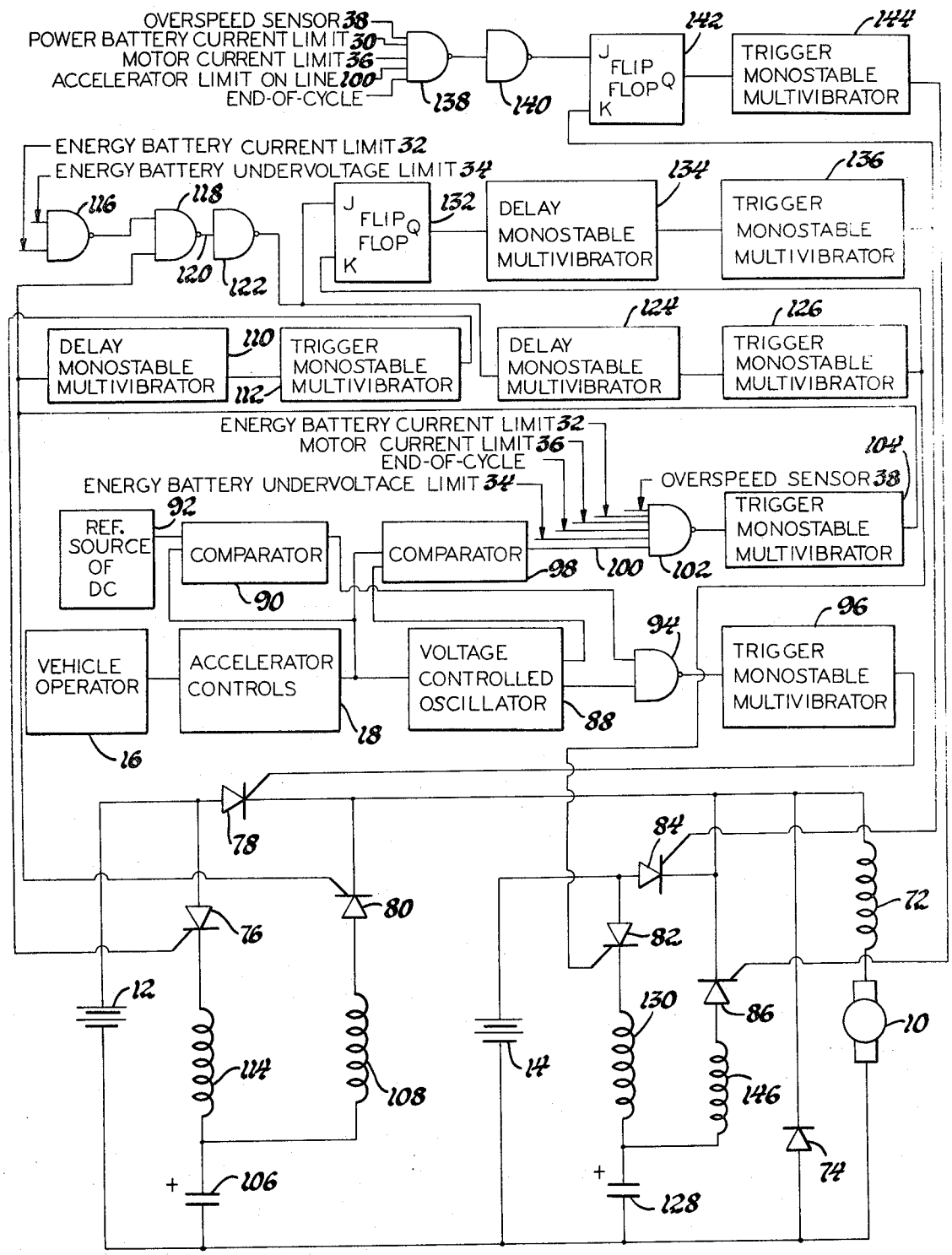
FIG. 2 is a schematic diagram of the pulse modulator connections and the controls required to effect the dual battery operation of this invention.

Reference should now be made to the drawing of FIG. 2 wherein the controls for the dual battery supply of this invention are more particularly set forth. The energy battery 12 and the power battery 14 of the circuit of FIG. 2 can take a variety of known forms. Fuel cells or other batteries capable of supplying substantial amounts of energy are most desirable for incorporation as energy batteries. One battery successfully used in an experimental vehicle is a zinc-air replaceable electrode battery. A typical voltage output from such a zinc-air battery is on the order of 150–200 volts and a typical current output is on the order of 150 amps maximum. The power battery 14 can also take a variety of known forms including a lead acid storage battery. No special relationship is required between the current ratings or voltage ratings of the energy and power batteries. A typical terminal voltage for a storage battery used for the power battery 14 is on the order of 100–150 volts, and a typical maximum current is on the order of 200 amps.

In operation, the energy battery 12 supplies the primary power requirements of the motor 10, and the power battery 14 is used to augment the power available from the energy battery 12 during intervals of acceleration and other high power demand load situations. An inductor 72 is included for current smoothing to avoid the pulsating application of power to the motor 10. A free wheeling diode 74 is included to permit current continuity for the motor 10 though both the energy battery and power battery circuits are open circuited. Thus, the electrical inertia of inductor 72 and the current path through diode 74 improve the DC character of the current supplied to the motor 10 during vehicle operation.

Trigger signals are developed for the controlled rectifiers 76, 78, and 80 of the pulse modulator connecting energy battery 12 with the motor 10 and the controlled rectifiers 82, 84, and 86 of the pulse modulator connecting the power battery 14 with the motor 10 by the logic array of the drawing of FIG. 2. Control of the pulse modulators is effected by the vehicle operator 16 when he manipulates the accelerator pedal of the accelerator controls 18. As noted above, the accelerator controls 18 provide a DC voltage output proportional to the instantaneous position of the accelerator pedal.

In operation, the following control sequence is provided to energize the motor 10. The operator actuates the vehicle key control 22, selects forward or reverse by positioning the shift controls 20, and depresses the accelerator pedal of accelerator controls 18 as an indication of power demand. If the accelerator pedal is depressed less than approximately 10 percent, the system operates in a frequency modulation mode and the energy battery alone provides power to the motor 10; whereas if the accelerator pedal is depressed to a point in excess of the 10% position, pulse modulation results and both the energy battery and the power battery deliver power to the motor 10 if conditions warrant augmenting the energy battery's power level. Of course, if the energy battery is capable of delivering the full power required, it alone supplies the motor 10 even during the pulse modulation mode of operation. All of these situations will be fully described below starting with the frequency modulation mode of operation.

In the frequency modulation mode of operation, the accelerator pedal is depressed to a position less than 10 percent of its full travel. The DC voltage output from the accelerator controls 18 is connected to a voltage controlled oscillator 88. This voltage controlled oscillator 88 provides a sawtooth output voltage having a frequency dependent on the instantaneous accelerator pedal position. The sawtooth waveform thus generated is monitored by the logic array of the drawing to control the timing of trigger signals to all the semiconductor controlled rectifiers 76, 78, 80, 82, 84, and 86. In the frequency modulation mode of operation, only controlled rectifiers 76 and 80 are gated conductive, and the power applied to the motor 10 is derived exclusively from the energy battery through the circuitry connected with these two controlled rectifiers.

Voltage controlled oscillator 88 is a conventional sawtooth oscillator providing a sawtooth output waveform whose frequency is controlled by the magnitude of an input DC voltage. A typical oscillator includes a current source (not illustrated, but comprising, e.g., a commercially available operational amplifier) whose current level is dependent on the magnitude of a DC input voltage and a capacitor connected with the output of the current source. The voltage of the capacitor has a ramp character wherein the slope of the ramp depends on the current level from the current source. A reset circuit is connected with the capacitor to discharge it each time its voltage attains a predetermined level. Hence, sawtooth oscillations are provided across the capacitor with a frequency determined by the input DC voltage.

In the control system of the drawing, the sawtooth oscillator 88 provides a second output from a monostable multivibrator sensing the capacitor voltage and providing a high level signal of a predetermined pulse width at the start of each oscillator cycle. In operation, this pulse coincides in time with the time of discharging the oscillator's capacitor. Thus, at the beginning of each cycle, the process of discharging the capacitor introduces a predetermined delay preceding the start of the ramp voltage. The ramp voltage then proceeds to the predetermined level at which the capacitor is again discharged. This cycle then repeats and the requisite sawtooth voltage waveform is generated.

As noted above, the voltage controlled oscillator 88 is controlled by the output from the accelerator controls 18, and the oscillator 88 provides an output oscillation only during periods of operator demand as indicated by the DC output voltage from the accelerator controls 18. For the control circuit of the drawing, the frequency of the oscillator 88 varies from zero hz. to approximately 500 hz. as the accelerator pedal traverses the zero to 10% range of its travel. In the 10 percent to 100 percent range of travel, the voltage controlled oscillator has a constant frequency on the order of 500 hz. Since the oscillator 88 is actuated by the accelerator controls 18 to control the supply of motor 10, no creep torque is developed by the drive system when the accelerator pedal is nondepressed since the oscillator 88 does not provide any output until the accelerator pedal is depressed.

The accelerator controls 18 is connected with a comparator 90 where the DC voltage output from the potentiometer connected with the accelerator pedal is compared with a DC voltage from a reference source of DC voltage 92 which can take a variety of known forms including a reference battery. This comparator 90 has a low value output until the DC voltage from the accelerator controls 18 exceeds the voltage level of the reference source of DC voltage 92. At this time, the comparator changes to a high value output which is maintained until the DC voltage from the accelerator controls 18 is again reduced below the level of the reference source of DC voltage 92. In the control system of this invention, the reference source of DC voltage 92 is selected to have a voltage substantially equal to the voltage from the accelerator controls 18 at the 10 percent travel point of the accelerator pedal. Therefore, the NAND gate 94 has a constant high value output in response to the low value input from the comparator 90 until the accelerator pedal is depressed to a position in excess of 10 percent of its travel. Accordingly, the trigger monostable multivibrator 96 connected with the controlled rectifier 78 is disabled and controlled rectifier 78 remains nonconductive until the accelerator pedal is depressed to a position in excess of 10 percent. In this manner, the controlled rectifier 78 is maintained nonconductive during the frequency modulation mode of operation.

NAND gate 94 is a conventional NAND logic element generally known and commercially available. This NAND logic element provides a two state output having a value dependent on the instantaneous values of all inputs to the NAND gate. The NAND gate has a high value output unless and until all inputs are provided a high value at which time the output assumes a low value. In the case of the two input NAND gate 94, the output has a high value except when both input signals have a high value. When both input signals have a high value, the output provides a low value. Inasmuch as NAND logic elements are generally known and commercially available as packaged modules, no circuit is illustrated or described. All NAND gates shown in the drawing have the same operating characteristics as set out above for the NAND gate 94 and, accordingly, an understanding of the operation is assumed for the following discussion.

Trigger monostable multivibrator 96 and all other monostable multivibrators shown in the drawing are connected to provide high value output pulses in response to the rising edge of an input signal. The delay monostable multivibrators of the drawing introduce a predetermined low value controlled time delay between the high value output pulse provided and the rising edge of the input pulse applied to the delay monostable multivibrator. The times for the high value output pulses from the trigger monostable multivibrators and the delay times preceding the start of the high value output pulses of the delay monostable multivibrators are controlled by the selection of the timing capacitor of the respective monostable multivibrator. All the monostable multivibrators of the drawing are of a conventional design. Inasmuch as these monostable multivibrators are generally known in the art and packaged modules providing the function are commercially available, no circuit is illustrated or described.

Hereafter an understanding of the operation of these monostable multivibrators is assumed, and it is reiterated that each provides a high value output pulse initiated in response to the rising edge of each input pulse applied to it. A distinction for the delay monostable multivibrators is noted in that the start of the high value output pulse is delayed a predetermined controlled time from the rising edge of the input pulse initiating it.

When the accelerator pedal is depressed, a DC signal from the accelerator controls 18 is connected with the comparator 98 for comparison with the output sawtooth waveform from the voltage controlled oscillator 88. Line 100 connects the comparator 98 with a six input NAND logic element 102. This NAND gate has inputs connected by conductors (not illustrated) from the overspeed sensor 38, the energy current battery limit 32, the motor current limit 36, and the energy battery undervoltage limit 34 of FIG. 1. As described above, these various controls normally provide high value outputs but develop low value output pulses during each cycle of the sawtooth waveform of the voltage controlled oscillator 88 if the parameter being monitored is within a certain range of values.

Voltage controlled oscillator 88 is connected by conductors (not illustrated) with the limits of FIG. 1 and, accordingly, provides the ramp signal for the limits 30, 32, 34, and 36 and the overspeed sensor 38 described above in conjunction with FIG. 1. Each of the comparator outputs from these controls is connected with the NAND gate 102 to effect control of the pulse width of voltage pulses from the energy battery during pulse width modulation. Each voltage pulse from the energy battery is terminated by the limit which dictates the minimum pulse width to avoid exceeding predetermined maximum values for the sensed parameters. Each of the limits provides a low value output at the point in the cycle at which the particular limit requires termination of the voltage pulse. If no pulse occurs prior to the end of the sawtooth cycle, an end-of-cycle signal causes the NAND gate output to switch to a high value to terminate the voltage pulse. The end-of-cycle signal is merely the inverse of the monostable multivibrator output from the oscillator 88 described above. This end-of-cycle signal is developed by connecting the oscillator 88 multivibrator output through a NAND gate (not illustrated) with the end-of-cycle input to NAND gate 102. The control effected when the NAND gate 102 switches to its high state is more fully described below.

Comparator 98 operates in a manner identical to that described above for the various limits and the speed sensor 38. The DC signal from accelerator controls 18 is compared with the ramp voltage from the voltage controlled oscillator 88, and the comparator 98 provides a change of state from a high value to a low value when the instantaneous magnitude of the ramp exceeds the DC level input to the comparator. In this manner, control of the change of state of NAND gate 102 is effected by the operator as he manipulates the accelerator controls 18.

When the supply system is operating in the frequency modulation mode, comparator 98 changes state at that point in the sawtooth cycle at which the ramp voltage exceeds the DC voltage from the accelerator controls 18. This change of state by comparator 98 applies a low value input to the NAND gate 102 causing a high value output pulse from the NAND gate 102 to initiate a trigger signal from the trigger monostable multivibrator 104. This monostable multivibrator 104 provides a gate signal to the controlled rectifier 80 connecting the capacitor 106 with the motor 10 through the inductor 108. This allows capacitor 106 to discharge through inductor 108 and the motor 10. Inductor 108 causes a ringing of the capacitor 106 when controlled rectifier 80 is gated conductive to charge capacitor 106 with a polarity opposite to that indicated in the drawing. Controlled rectifier 80 is inherently commuted when capacitor 106 attains its full charge and the current falls below the requisite sustaining level.

A delay monostable multivibrator 110 introduces a time delay between the rising edge of the trigger pulse applied to controlled rectifier 80 and a pulse applied to a trigger monostable multivibrator 112. When the delay monostable multivibrator initiates a high value output pulse, a high value output pulse is simultaneously initiated at the output of the trigger monostable multivibrator 112 to gate the controlled rectifier 76 conductive.

When controlled rectifier 76 is gated conductive, an inductor 114 and capacitor 106 are serially connected with the energy battery 12. As a result of this connection, capacitor 106 charges to a voltage of the polarity indicated. The final voltage of capacitor 106 is in excess of the voltage of energy battery 12. The voltage exceeds that of the energy battery 12 as a result of the inclusion of inductor 108 which produces a ringing effect in the charging circuit. Controlled rectifier 76 is inherently commuted when the capacitor is fully charged and current flow through the controlled rectifier 76 subsides and falls below the requisite sustaining level for the controlled rectifier 76.

When a signal from comparator 98 is next applied to NAND gate 102, controlled rectifier 80 is gated conductive thereby permitting the capacitor 106 to discharge through the motor circuit and to provide power to drive the motor. Again, commutation is inherent when the capacitor 106 attains its full charge having a polarity the opposite of that shown in the drawing since no sustaining current is available to maintain the controlled rectifier 80 in its conductive mode.

The inductor 72 effects current smoothing to minimize the pulse character of power delivered to the motor 10, and the free wheeling diode 74 is effective intermediate current pulses to provide current continuity in the path including the free wheeling diode 74, the inductor 72, and the motor 10. During frequency modulation, the frequency of the above cycle is varied to vary the power level.

To summarize the frequency modulation mode of operation, it is reiterated that the following occurs during each cycle of the sawtooth waveform of the voltage controlled oscillator 88. Controlled rectifier 80 is gated conductive by a trigger signal from the monostable multivibrator 104 in response to a high value output from comparator 98 connected to the input of the NAND gate 102. Thus, controlled rectifier 80 connects the capacitor 106 with the motor 10. After a predetermined time delay determined by the delay monostable multivibrator 110, trigger monostable multivibrator 112 applies a gate signal to controlled rectifier 76 initiating conduction by this controlled rectifier to recharge capacitor 106 with a voltage having the polarity indicated in the drawing. Controlled rectifier 78 is maintained nonconductive by way of the low value input to NAND gate 94 from the comparator 90 throughout the operation in the frequency modulation mode. Finally, during operation in the frequency modulation mode, the controlled rectifiers 82, 84, and 86 of the pulse modulator connected with the power battery 14 are nonconductive as a result of a NAND gate 116. The NAND gate effects control of the pulse modulator connected with the power battery 14 in a manner more fully described below in conjunction with the description of the dual battery mode of operation.

When the accelerator pedal is depressed to a position in excess of 10% of its travel, the NAND gate 94 is supplied a high value input from the comparator 90, and the signal connected from the voltage controlled oscillator 88 with the NAND gate 94 indicates the start of each cycle of the sawtooth waveform. This signal connected from the oscillator 88 with the NAND gate 94 is the output signal of the monostable multivibrator noted above. As stated there, this monostable multivibrator provides a high value output prior to the start of each cycle of the ramp voltage of the oscillator 88. Since the input to NAND gate 94 from the comparator 90 is high, the periodic high value input to the NAND gate 94 from the oscillator 88 causes the output of the NAND gate 94 to have a low value output coextensive in time with the high value output of the monostable multivibrator included in the oscillator 88. At the termination of the low value output pulse from the NAND gate 94, the rising signal at the output of NAND gate 94 connected with trigger monostable multivibrator 96 causes a trigger signal to be applied to controlled rectifier 78 to gate this controlled rectifier conductive.

During the pulse modulation mode of operation, the voltage applied to the motor 10 from the energy battery 12 has a varying pulse width determined by the various limits connected with the NAND gate 102. Accordingly, the controlled rectifier 78 is gated conductive at the start of each cycle of the sawtooth voltage of oscillator 88 and rendered nonconductive when the controlled rectifier 80 is gated conductive at a subsequent point in the cycle, which point is determined by the limits connected with the NAND gate 102. Thus, the first control limitation attained during the cycle of the sawtooth voltage provides a control signal, and commutation of controlled rectifier 78 is effected when controlled rectifier 80 is gated conductive by the trigger monostable multivibrator 104 in response to the change in the output state of the NAND gate 102. Commutation of controlled rectifier 78 is effected when controlled rectifier 80 is gated conductive such that the capacitor 106 charged with the polarity indicated in the drawing connects a reverse bias voltage across the series combination of the energy battery 12 and the controlled rectifier 78. Since the voltage on capacitor 106 exceeds the voltage of the energy battery 12, it should be appreciated that the cathode-anode of the controlled rectifier 78 is reverse biased to terminate conduction therethrough. Capacitor 106 completes its discharge after controlled rectifier 78 ceases conduction, in the manner described for frequency modulation, through the motor 10. As described above in regard to the frequency modulation mode of operation, subsequent to the inherent termination of conduction through controlled rectifier 80 at the time when capacitor 106 is incapable of providing an adequate sustaining current, the controlled rectifier 76 is gated conductive by trigger monostable multivibrator 112 to recharge capacitor 106, with the polarity shown, in preparation for the subsequent cycle. In the above described operation, the width of the voltage pulses can be limited by any of the six limiting conditions recited and shown in the drawing as inputs to NAND gate 102.

Dual battery operation is initiated if the limiting parameter for the pulse width control for the energy battery 12 is either the energy battery undervoltage limit 34 or the energy battery current limit 32. In this situation, the energy battery is limited in operation as a result of an excessive demand for current from the energy battery or a reduction in voltage available from the energy battery. The NAND gate 116 is provided these two input signals, one each from the energy battery undervoltage limit 34 and the energy battery current limit 32. These inputs are both at a high value unless one or both limits the voltage pulse width for the energy battery 12. On the occurrence of one of these limitations, the input associated therewith to the NAND gate 116 has a low value and the output from the NAND gate 116 connected with the NAND gate 118 changes state to a high value. A second input to the NAND gate 118 is provided by the output from the trigger monostable multivibrator 104. Accordingly, the output of NAND gate 118 on line 120 will be at a high value until and unless the NAND gate 116 provides a high value and the trigger monostable multivibrator 104 provides a trigger to the controlled rectifier 80. In this manner, the two NAND gates 116 and 118 disable the pulse modulator connected with the power battery 14 when the energy battery alone is capable of supplying the motor 10.

It should be appreciated that the operation of the two pulse modulators in the drawing is synchronized such that simultaneous connection of both the energy battery 12 and the power battery 14 with the motor 10 is impossible. This synchronization is effected by NAND gates 116 and 118 and their respective inputs. The pulse modulator connected with power battery 14 is activated when the NAND gates 116 and 118 enable the trigger circuitry for controlled rectifiers 82, 84, and 86 as set forth hereinafter. A low value input to NAND gate 116 from one or both the limits connected with it is a prerequisite of any connection between the power battery 14 and the motor 10 during dual battery operation. This condition together with the application of a high value input to NAND gate 118 from the trigger monostable multivibrator 104 initiates the control sequence connecting the power battery 14 with the motor 10.

A NAND gate 122 inverts the signal available on line 120. Thus, the NAND gate 122 has a high value output when the energy battery undervoltage limit 34 and/or the energy battery current limit 32 provides a low value input to the NAND gate 116 during the cycle of the sawtooth voltage from oscillator 88 and at the same time trigger monostable multivibrator 104 provides a trigger pulse to controlled rectifier 80. This high value pulse is connected with a delay monostable multivibrator 124 which, as described above, provides a high value pulse output after a predetermined low value time delay. The pulse output from the delay monostable multivibrator 124 is connected with a trigger monostable multivibrator 126 to generate a gate signal for the controlled rectifier 82.

This gate signal renders controlled rectifier 82 conductive and capacitor 128 is charged by the power battery 14 through the inductor 130. Commutation is inherent when the capacitor attains its full charge and current falls below the level necessary to sustain controlled rectifier 82 in its conductive mode. As a consequence of the inclusion of inductor 130, capacitor 128 rings to a voltage level in excess of the voltage of the power battery 14.

A two input flip-flop 132 has its inputs connected with the output of NAND gate 122 and the output of trigger monostable multivibrator 126. The output Q from the flip-flop 132 depends on the sequence of signals applied to the J and K inputs of the flip-flop. On the falling edge of each pulse applied to the K input, the Q output changes to its low state, and the Q output changes to its high state on the falling edge of each pulse connected with the J input. Of course, if the Q output is low, an additional pulse to the K input is ineffectual to change the state of the output. Similarly, if the output is high, signals applied to the J input do not cause the output to change.

Flip-flop 132 ensures that a predetermined sequence is followed when operation of the pulse modulator connecting power battery 14 with the motor 10 is first initiated. According to this sequence, the controlled rectifier 82 is the first of the three controlled rectifiers 82, 84, and 86 gated conductive thereby charging the capacitor 128 in preparation for turning off controlled rectifier 84. It is noted that the flip-flop 132 is of a conventional design generally known in the art and, accordingly, no circuit or description directed thereto is included. The functional operation set out above fully describes the operation of the flip-flop, and commercially available circuit modules can be readily adapted to provide the stated function.

A delay monostable multivibrator 134 is triggered by the rising edge of each pulse output at the output Q from the flip-flop 132. Thus, each time the J input goes low causing the Q output to go high, the delay monostable multivibrator 134 is provided the rising edge of a pulse signal, and after a predetermined delay, an output pulse from the monostable multivibrator 134 is connected to the trigger monostable multivibrator 136. This trigger monostable multivibrator 136 signal gates controlled rectifier 84 conductive connecting the power battery 14 through inductor 72 with the motor 10.

Flip-flop 132 is reset such that the Q output is again low by the subsequent falling edge of the pulse from the trigger monostable multivibrator 126 connected with the K input to the flip-flop 132. It is noted that controlled rectifiers 82 and 84 can be simultaneously conductive during a portion of the operating cycle of the pulse modulator connected with the power battery 14.

The shut-off controlled rectifier 86 is gated conductive when one of the five limits connected with the NAND gate 138 provides a control signal. These limits include power battery current limit 30, the motor current limit 36, and the overspeed sensor 38 of FIG. 1 together with the accelerator limit on line 100 from the comparator 98 and the end of cycle indication noted above in conjunction with NAND gate 102. Each of these five inputs to the NAND gate 138 normally has a high value changing to a low value when the parameter being sensed indicates the cycle should terminate. Thus, NAND gate 138 provides a low value output until one of the five control inputs changes the value of its input to the NAND gate to a low value. NAND gate 140 inverts the output from NAND gate 138 and applies this inverted signal to the J input of a flip-flop 142. This flip-flop 142 has J and K inputs and a Q output and operates in a manner identical with that described above for flip-flop 132.

The K input to the flip-flop 142 is connected with the output of trigger monostable multivibrator 136. On each rising edge of the Q output, a trigger monostable multivibrator 144 is gated conductive to initiate conduction by controlled rectifier 86 connecting capacitor 128 through the inductor 146 to reverse bias controlled rectifier 84 to terminate conduction therethrough. Flip-flop 142 disables the trigger monostable multivibrator 144 except during intervals in which both batteries are required to supply the motor 10. This results from the necessity of resetting the flip-flop by applying a signal to the K input intermediate each pair of input signals to the J input for the input signals to the J input to be effective to switch the Q output.

Figure 3:
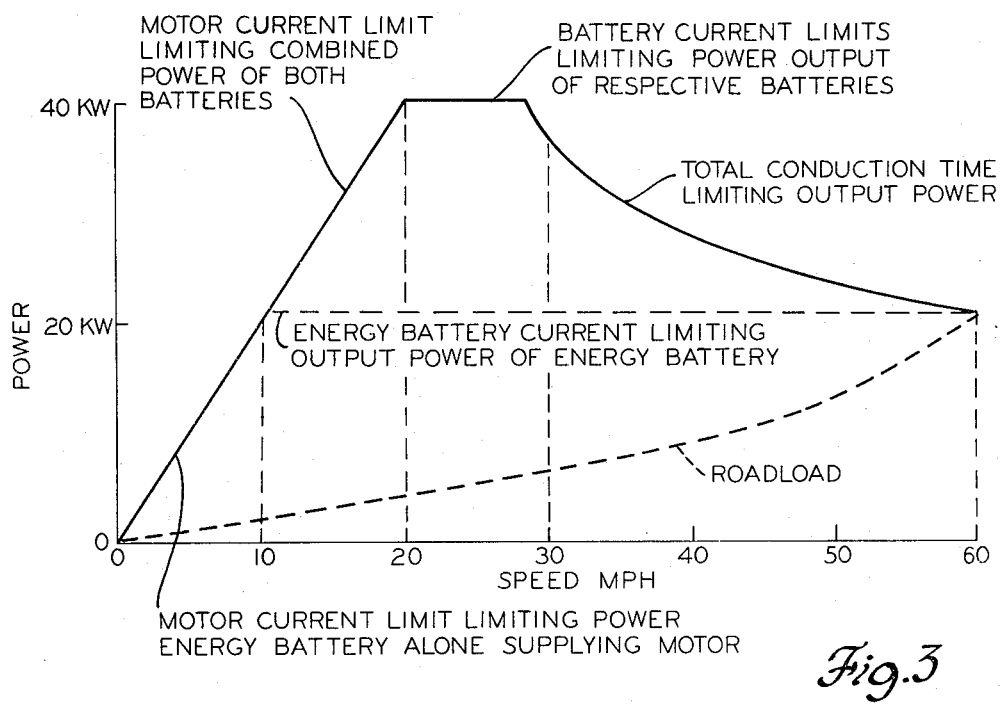
FIG. 3 is a graphical summary of the power versus speed operating characteristic of the electric drive vehicle.

Reference should now be made to FIG. 3 wherein a graph of power versus vehicle speed is shown. This graph summarizes the operation of a vehicle driven from a standing start to a speed of 60 miles per hour with the accelerator pedal fully depressed. Both the energy battery and the power battery are capable of providing 20 KW of power to the vehicle drive motor. A road load curve superposed on the graph of FIG. 3 shows the relation of road load to vehicle speed during operation. Although the 20 KW available from the energy battery is adequate for steady state operation at any speed up to 60 miles per hour, during acceleration the power demand exceeds the available power from the energy battery necessitating concurrent power supply from both the energy battery and the power battery. This concurrent power supply is effected in accordance with the time sharing supply system described above wherein simultaneous connections of both batteries with the motor are obviated by synchronization of the pulse modulators connecting the respective batteries with the motor.

As noted, the graph depicts the operation associated with maximum acceleration. As shown in the graph, from approximately zero to 10 miles per hour, the motor current is the limit controlling the width of voltage pulses from the energy battery and the energy battery is the exclusive source of power. Considering the FIG. 2 circuitry and description, this means that the pulse modulator connected with the energy battery operates in the pulse width modulation mode and the termination of conduction by the controlled rectifier 78 results from the control of the motor current limit 36.

From approximately 10 to 20 miles per hour, the motor current limit 36 is still the limiting control; however, the total power demand exceeds the capability of the energy battery alone, necessitating operation of both the energy battery and the power battery. Again, referring to FIG. 2 and the explanations associated therewith, it should be appreciated that in the 10 to 20 miles per hour range, the energy battery provides voltage pulses limited in time by the energy battery current limit 32, whereas the power battery voltage pulses are limited in time by the motor current limit 36.

In the 20 to 30 miles per hour range, the power battery current limit 30 limits the width of the pulse during the operation of the power battery supply. Thus, the energy battery supplies its maximum power as determined by its current limit and the power battery supplies its maximum power as determined by its current limit. In this range of operation, the motor would permit additional power to be delivered if the combined battery operation had the capacity. Of course, redesign and adjustment of the power limitations of the two batteries would modify these limitations as would a substitution of the motor.

From 30 to 60 miles per hour, the conduction time is the limiting factor for operation. Thus, it should be understood that the energy battery current limit 32 is still controlling the terminal point in the energy battery's operation, but the total cycle time is controlling the operation of the power battery. The end-of-cycle signal causes the voltage pulse from the power battery to terminate.

Figure 4:
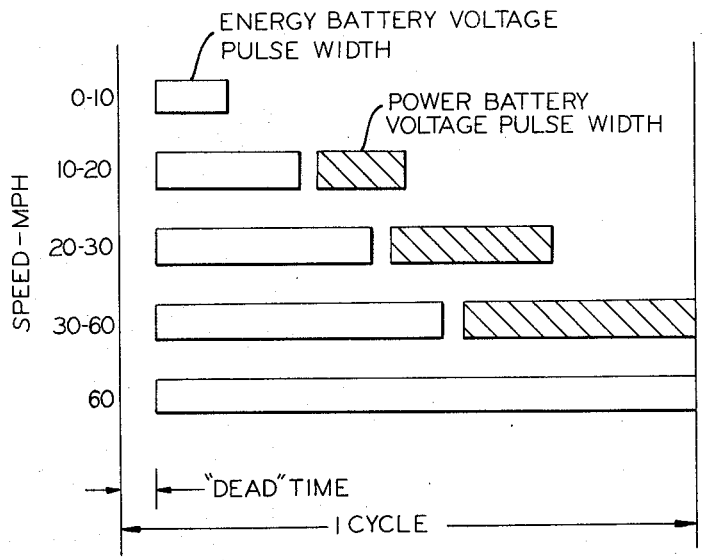
FIG. 4 shows one cycle of operation for the power control system of this invention in each of the distinct operating speed ranges of the graph of FIG. 3.

To recapitulate, reference should be made to FIG. 4 where a summary of one cycle of operation for each speed range is shown. Each cycle is initiated by the rising voltage from the voltage controlled oscillator 88 of FIG. 2 and a short dead time is included at the outset to permit and ensure all electronics are reset. This dead time is coextensive with the monostable multivibrator output pulse associated with the oscillator 88 and noted above. After the dead time, the energy battery provides the first voltage pulse to the motor. Thus, from zero to 10 miles per hour, the energy battery being the exclusive source of voltage, it alone supplies the motor during each pulse.

At 10 miles per hour and at all speeds in excess of 10 miles per hour, the energy battery is limited by the limitation on current available therefrom. However, the time increment for each pulse of voltage from the energy battery necessary to supply this maximum current varies. This follows since the impedance of the motor is continuously varying, whereas the voltage of the energy battery is substantially fixed and constant. This explains the difference in extent of the pulses from the energy battery in the various speed ranges.

From 10 to 20 miles per hour, the energy battery supplies voltage until commuted at the current limit point and the power battery provides voltage pulses until commuted by the motor current limit. In this range, the power battery is capable of supplying longer pulses than required and in fact the width of the pulse from the power battery varies as the speed traverses the 10 to 20 miles per hour range.

In the 20 to 30 miles per hour range, both batteries are supplying maximum current to the motor. Accordingly, each is terminated when its respective current limit causes commutation of the respective controlled rectifiers 82 and 94 of FIG. 2. In this range, it should be appreciated that pulse widths are continually varying to take account of the varying impedance level of the motor. At 30 miles per hours, the end-of-cycle limit controls the width of the pulse from the power battery as the total conduction time available is the limiting factor. Thus, the energy battery voltage pulse which is continually increasing in width as a result of the change of impedance is still limited by the energy battery current limit signal, but the power battery pulse is limited by the end-of-cycle limit.

Finally, from 30 to 60 miles per hour, the power battery is capable of supplying a greater voltage pulse than is permissible in operation due to the time limitation. Also, during the time the vehicle accelerates from 30 to 60 miles per hour, the width of the voltage pulse from the energy battery continually increases, and at 60 miles per hour, the energy battery is connected with the motor for the maximum permissible time for each cycle. At 60 miles per hour, the limitation associated with the energy battery current and the conduction time or end-of-cycle limit are coincident.

As discussed above, the limiting circuits, such as limiters 30, 32, 34, and 36 shown in FIG. 1, are conventional and include a device for sensing an operating parameter and then comparing this parameter with a sawtooth or ramp voltage. One example of a circuit arrangement which will perform this function is disclosed in the patent to Shehecn U.S. Pat. No. 3,213,343. It has also been pointed out that the current shunts which sense the motor, power battery, and energy battery currents are conventional and develop a voltage which is applied to a conventional comparator, as explained hereinbefore, to provide the requisite control signals for the system. A typical example of the use of such a shunt and a comparator circuit is disclosed in the patent to Lehry U.S. Pat. No. 3,340,456.

Although the above description has reference to a particular preferred embodiment of the instant invention, it should be appreciated that various changes and modifications could be engrafted thereon by one skilled in the art within the scope of the following claims.

I claim:

1. A power supply for supplying an electric drive motor in a vehicle electric drive comprising: a primary source of direct voltage, a secondary source of direct voltage, a first energizing circuit path including a first semiconductor controllable switching device interconnecting said electric drive motor and said primary source of direct voltage, said first semiconductor controllable switching device affording control of the connection of said electric drive motor and said primary source of direct voltage including control of the time of initiation and the time of termination of current flow therebetween, a second energizing circuit path including a second semiconductor controllable switching device and excluding both said primary source of direct voltage and said first semiconductor controllable switching device for interconnecting said electric drive motor and said secondary source of direct voltage, said second semiconductor controllable switching device affording control of the connection of said electric drive motor and said secondary source of direct voltage including control of the time of initiation and the time of termination of current flow therebetween, and a control means coupled to said first and second semiconductor switches for controlling the switching of said first semiconductor switch while preventing conduction of said second semiconductor switch during a first mode of operation whereby said motor is supplied solely by said primary battery during said first mode of operation, said control means including means responsive to a predetermined electrical loading condition of said primary source of direct voltage of said vehicle drive system for causing said semiconductor switches to operate in a second mode of operation, said control means during said second mode of operation sequentially rendering said first and second semiconductor controllable switching devices alternately and consecutively conductive to provide power from both said primary and secondary sources of direct voltage when said loading condition is attained, said control means including means for varying the duty cycle of each of said controllable switching devices in response to an operating condition of said system whereby each source supplies a predetermined portion of the power required to operate said electric drive motor during said second mode of operation.

2. A dual battery power supply for an electric drive vehicle comprising: an electric drive motor, an energy battery, a power battery, a first pulse modulator including a first controlled rectifier, a first circuit path including said first pulse modulator interconnecting said electric drive motor and said energy battery, said first controlled rectifier affording control of the connection of said electric drive motor and said energy battery including control of the time of initiation and the time of termination of current flow therebetween, a second pulse modulator including a second controlled rectifier, a second circuit path including said second pulse modulator and excluding both said energy battery and said first pulse modulator for interconnecting said electric drive motor and said power battery, said second controlled rectifier affording control of the connection between said electric drive motor and said power battery including control of the time of initiation and the time of termination of current flow therebetween, and a control means coupled to said first and second controlled rectifiers for controlling the switching of said first controlled rectifier while preventing conduction of said second controlled rectifier during a first mode of operation whereby said motor is supplied solely by said energy battery during said first mode of operation, said control means including means responsive to a predetermined electrical loading condition of said energy battery for sequentially rendering said first controlled rectifier and said second controlled rectifier alternately and consecutively conductive to provide power from both said energy battery and said power battery to said electric drive motor when said electrical loading condition attains said predetermined value and during a second mode of operation, said control means effecting control of said batteries such that each of said batteries has a variable duty cycle and provides a controllable portion of the power required to operate said electric drive motor during said second mode of operation.

3. A power control system for a vehicle electric drive comprising: an electric drive motor, a primary direct voltage source, a secondary direct voltage source, a first circuit path including a first controllable switching device interconnecting said electric drive motor and said primary direct voltage source, said first controllable switching device affording control of the connection of said electric drive motor and said primary direct voltage source including control of the time of initiation and the time of termination of current flow therebetween, a second circuit path including a second controllable switching device and excluding both said primary direct voltage source and said first controllable switching device interconnecting said electric drive motor and said secondary direct voltage source, said second controllable switching device affording control of the connection of said electric drive motor and said secondary direct voltage source including control of the time of initiation and the time of termination of current flow therebetween, and a control means connected with both said first controllable switching device and said second controllable switching device to control the power from said first and second direct voltage sources to said electric drive motor, said control means including means sensing at least one vehicle operating parameter, said control means causing distinct modes of operation by said power control system according to the instantaneous values of the sensed vehicle operating parameter, said control means causing said primary direct voltage source to be the exclusive supply for said electric drive motor when said sensed vehicle operating parameter is within a first predetermined range of values, said control means causing said switching devices to become alternately and consecutively conductive whereby said primary and secondary direct voltage sources alternately supply said electric drive motor when said sensed vehicle operating parameter is within a second predetermined range of values, said control means effecting control of said primary direct voltage source and said secondary direct voltage source such that each source has a variable duty cycle and such that each source provides a portion of the power required to operate said electric drive motor when said sensed vehicle operating parameter is within said second predetermined range of values.

4. A dual battery power supply for an electric drive vehicle comprising: an electric drive motor, an energy battery, a power battery, a first pulse modulator including a first semiconductor controllable switching device, a first circuit path including said first pulse modulator interconnecting said electric drive motor and said energy battery, said first semiconductor controllable switching device affording control of the connection of said electric drive motor and said energy battery including control of the time of initiation and the time of termination of current flow therebetween, a second pulse modulator including a second semiconductor controllable switching device, a second circuit path including said second pulse modulator and excluding both said energy battery and said first pulse modulator for interconnecting said electric drive motor and said power battery, said second semiconductor controllable switching device affording control of the connection between said electric drive motor and said power battery including control of the time of initiation and the time of termination of current flow therebetween, and a control source connected with both said first pulse modulator and said second pulse modulator to control the conduction of both said first semiconductor controllable switching device and said second semiconductor controllable switching device, said control source including means for sensing operating parameters of the electric drive, said control source effecting cyclic operation of said first and second pulse modulators, said control source causing said first semiconductor controllable switching device to conduct during each cycle and said second semiconductor controllable switching device to remain nonconductive throughout each cycle when said sensed parameters have values in a first predetermined range of values, said control source causing said first semiconductor controllable switching device to conduct during each cycle and said second semiconductor controllable switching device to conduct each cycle during a time interval in which said first semiconductor controllable switching device is nonconductive when said sensed parameters have values in a second predetermined range of values, said energy battery exclusively supplying said electric drive motor when said sensed parameters are in said first predetermined range of values, said power battery augmenting the power from said energy battery to supply said electric drive motor from both batteries when said sensed parameters are in said second predetermined range of values.

5. A power supply for supplying electric power to an electric drive motor of an electrically propelled vehicle, comprising: an electric motor for driving at least one wheel of said vehicle, a primary source of direct voltage, a secondary source of direct voltage, a first energizing circuit for said motor including a first switching means operable to connect and disconnect said primary source of direct voltage and said motor to thereby control the average voltage applied to said motor, a second energizing circuit for said motor including a second switching device for energizing said electric motor from said secondary source of direct voltage, a control means coupled to said first and second switching devices for controlling the switching operation of said first and second switching devices, said control means during a first mode of operation of said vehicle causing said first switching device to periodically connect and disconnect said motor and said primary source of direct voltage while maintaining said second switching device nonconductive to maintain said motor disconnected from said secondary source of direct voltage to thereby supply said motor solely from said primary source and at a voltage determined by the switching of said first switching device, said control means during a second mode of operation causing alternate and consecutive conduction of said first and second switching devices whereby said motor is alternately and consecutively connected to said primary source of direct voltage and said secondary source of direct voltage, and means responsive to a predetermined electrical loading condition of said primary source of direct voltage when said control means is operating in said first mode of operation for causing said control means to shift from said first mode of operation to said second mode of operation.

* * * * *